(12) United States Patent
Immel

(10) Patent No.: US 6,742,554 B1
(45) Date of Patent: Jun. 1, 2004

(54) DEVICE FOR OVERHEAT PROTECTION FOR A TYPE 4 COMPRESSED GAS CONTAINER

(75) Inventor: Rainer Immel, Mainz (DE)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/316,129

(22) Filed: Dec. 9, 2002

(51) Int. Cl.$^7$ .................................................. B64D 37/00

(52) U.S. Cl. ....................... 141/286; 141/3; 141/4; 141/18; 141/325; 222/3; 222/131; 137/264; 220/560.05; 220/560.07; 220/560.1; 220/560.11; 220/565

(58) Field of Search ........................... 141/2–4, 18, 20, 141/286, 325; 222/3, 131, 183; 137/255, 256, 264; 220/560.05, 560.07, 560.1, 560.11, 565

(56) References Cited

U.S. PATENT DOCUMENTS

| 2,418,036 | A | * | 3/1947 | Lane | 222/3 |
| 3,976,124 | A | * | 8/1976 | Brown | 165/103 |
| 4,108,219 | A | * | 8/1978 | Shulsinger | 141/3 |
| 6,450,193 | B1 | * | 9/2002 | Constantinou | 137/209 |

* cited by examiner

Primary Examiner—J. Casimer Jacyna
(74) Attorney, Agent, or Firm—Cary W. Brooks

(57) ABSTRACT

A pressure container (70) for storing hydrogen gas (26) under pressure for a fuel cell engine. The container (70) includes an outer support layer (12) and a thermoplastic liner (14). An adapter (18) is provided in the outer layer (12) and the liner (14) to allow fill gas (20) to fill the container (70) under pressure. A fill vessel (72) is provided within the liner (14) and is sealed and thermally coupled to the adapter (18). The fill gas (20) is confined within a gap (78) between an outer surface of the fill vessel (72) and the liner (14) so that the temperature of the liner (14) is not significantly increased during the fill process. An opening (82) is provided in the fill vessel (72) so that the fill gas (20) forces the contained gas (26) within the container (70) into the fill vessel (72) through the opening (82).

22 Claims, 2 Drawing Sheets

DEVICE FOR OVERHEAT PROTECTION FOR A TYPE 4 COMPRESSED GAS CONTAINER

BACKGROUND OF THE INVENTION

1. Field of the Invention

This invention relates generally to a type 4 compressed gas container and, more particularly, to a type 4 compressed gas container for storing hydrogen gas on a vehicle for a fuel cell engine, where the container includes an inner vessel for preventing heated gas from damaging an internal liner of the container while the container is being filled with compressed gas.

2. Discussion of the Related Art

Hydrogen is a very attractive source of fuel because it is clean and can be used to efficiently produce electricity in a fuel cell. The automotive industry expends significant resources in the development of hydrogen fuel cells as a source of power for vehicles. Such vehicles would be more efficient and generate fewer emissions than today's vehicles employing internal combustion engines.

A hydrogen fuel cell is an electrochemical device that includes an anode and a cathode with an electrolyte therebetween. The anode receives hydrogen gas and the cathode receives oxygen. The hydrogen gas is ionized in the anode to generate free hydrogen ions and electrons. The hydrogen ions pass through the electrolyte to the cathode. The hydrogen ions react with the oxygen and the electrons in the cathode to generate water as a by-product. The electrons from the anode cannot pass through the electrolyte, and thus are directed through a load to perform work before being sent to the cathode. The work acts to operate the vehicle. Many fuels cells are combined in a stack to generate the desired power.

A vehicle fuel cell engine can include a processor that converts a liquid fuel, such as alcohols (methanol or ethanol), hydrocarbons (gasoline), and/or mixtures thereof, such as blends of ethanol/methanol and gasoline, to hydrogen gas for the fuel cell. Such liquid fuels are easy to store on the vehicle. Further, there is a nationwide infrastructure for supplying liquid fuels. Gaseous hydrocarbons, such as methane, propane, natural gas, LPG, etc., are also suitable fuels for both vehicle and non-vehicle fuel cell applications. Various processors are known in the art for converting the liquid fuel to gaseous hydrogen suitable for the fuel cell.

Alternatively, hydrogen gas can be processed separate from the vehicle and stored at filling stations and the like. The hydrogen gas is transferred from the filling station to pressurized tanks or containers on the vehicle to supply the desired hydrogen gas to the fuel cell engine as needed. Typical pressures within compressed hydrogen gas containers for fuel cell applications are in the range of 200 bar–700 bar.

Storage containers for compressed gases must have mechanical stability and integrity so that the container does not rupture or burst from the pressure within. It is typically desirable to make hydrogen gas containers on vehicles lightweight so as not to significantly affect the weight requirements of the vehicle. The current trend in the industry is to employ type 4 compressed gas tanks for storing compressed hydrogen gas on the vehicle. A type 4 tank includes an outer structural layer made of a synthetic material, such as a glass fiber or a carbon fiber wrap, and a plastic liner. The outer layer provides the structural integrity of the tank for the pressure contained therein, and the plastic liner provides a gas tight vessel for sealing the gas therein. The plastic liner is first formed by a molding process. Then, the fiber wrap is formed around the liner and caused to set thereto.

FIG. 1 is a cross-sectional view of a type 4 compressed gas container 10 currently contemplated in the industry to store compressed hydrogen gas on a vehicle for fuel cell engines. The container 10 is cylindrical in shape to provide the desired integrity, and includes an outer structural wall 12 and an inner liner 14 defining a container chamber 16 therein. The outer wall 12 is typically made of a suitable fibrous interconnected synthetic wrap, such as glass or carbon fiber wraps, and has a sufficient thickness to provide the desired mechanical rigidity for pressure containment. The liner 14 is typically made of a suitable plastic, such as a high-density polyethylene, to provide a gas tight containment vessel within the container 10. The thickness of the liner 14 is generally about 5 mm. Thus, the combination of the outer wall 12 and the liner 14 provides the desired structural integrity, pressure containment and gas tightness in a light-weight and cost effective manner.

The container 10 includes an adapter 18 that provides the inlet and outlet opening for the hydrogen gas contained therein. The adaptor 18 is typically a steel structure that houses the various valves, pressure regulators, piping connectors, excess flow limiter, etc. that allow the container 10 to be filled with the compressed hydrogen gas, and allow the compressed gas to be discharged from the container 10 at or near ambient pressure, or a higher pressure, to be sent to the fuel cell engine. The adapter 18 is made of steel to provide the structure desired for storing compressed hydrogen gas, and typically has a weight of about 5 kg. A suitable adhesive, sealing ring, or the like is employed to seal the liner 14 to the adapter 18 in a gas tight manner, and secure the adapter 18 to the outer wall 12.

FIG. 1 shows the container 10 being filled with a hydrogen fill gas 20 through the adaptor 18. During the filling process, the fill gas 20 flows into the container 10 from one end 22 of the container 10 to an opposite end 24 of the container 10 and becomes contained gas 26. As the filling process proceeds, the pressure in the container 10 increases. It is desirable that the temperature of the fill gas 20 be near ambient temperature (300 K, 27° C.) and be at a suitable pressure to fill the container 10 within a few minutes (less than three minutes). However, as a result of the thermodynamic properties of the fill gas 20 and the contained gas 26, adiabatic compression causes the contained gas 26 to be heated in response to the fill gas 20 being introduced therein under pressure.

This heating of the contained gas 26 within the container 10 presents a problem because the plastic liner 14 will be damaged if the temperature of the contained gas 26 increases above a fail temperature of the liner material, for example, above 85° C. If the temperature of the contained gas 26 exceeds the fail temperature of the liner material, the liner material properties will change (melt), and the gas sealing ability of the liner 14 may be compromised. Therefore, it is necessary to provide some technique for maintaining the temperature of the contained gas 26 within the container 10 below the liner fail temperature while the container 10 is being filled and thereafter.

FIGS. 2–4 depict simulations of the contained gas 26 being heated within the container 10. FIG. 2 is a plan view of a simulation model 28 where a container 30 is being filled with compressed gas 42 from an infinite reservoir 32 through a valve 34 depicting the Joule Thompson effect. The container 30 is separated into individual cells 36, here fifty cells, numbered from a first cell 38 closest to the fill point of the container 30 to a last cell 40 at an opposite end of the container 30 from the fill location. Before the filling process is initiated, each of the cells 36 is at a pressure 2.8 MPa and a temperature near ambient, about 300 K. Further, the temperature of the fill gas is also near ambient.

In this simulation, certain assumptions are made that are not present in real applications. First, there is no heat exchange between the contained gas and the container walls or other parts of the container, such as the adapter 18. Second, the reservoir 32 is infinitely large and therefore no pressure or temperature change occurs in the reservoir 32 during the filling process. Third, the fill gas is introduced in a longitudinal direction into the container 30 from left to right. Fourth, the same pressure is present throughout the container 30 during the fill process. Fifth, there is no back mixing of the fill gas inside the container 30, in that the flow is directed exclusively from the adapter 18 towards the opposite end. And sixth, the adiabatic compression of the contained gas in the container 30 through the residual gas is ideal.

As the pressure in the container 30 increases during the fill process, temperature readings are taken at different times. FIG. 3 is a graph with temperature in degrees Celsius on the vertical axis and the cell number on the horizontal axis. A graph line 44 represents the pressure, 2.8 MPa, in the container 30 before the fill gas is introduced. As is apparent, the temperature across the cells 36 is constant before the fill process. Graph lines 46, 48, 50, 52, 54 and 56 represent pressures of 5, 10, 15, 20, 25 and 35 MPa, respectively, at different fill times of the container 30.

As is apparent, the temperature in the cells 36 near the fill location of the container 30 remains relatively low through the entire fill process. This is because near the fill location the in-flowing cool fill gas 42 cools down the contained gas 26 and compensates for the temperature rise caused by the compression of the contained gas. However, the cells 36 farthest from the fill location heat up drastically as a result of adiabatic compression during the fill process, and exceed the fail temperature of the liner 14. Particularly, when the container 30 is completely full, the cells 36 opposite the fill location have a temperature above 350° C. However, in reality, the gas will mix throughout the cells 36, and some average lower temperature will be reached.

The above described model represents a worst case scenario of the increase in temperature of the contained gas within the container 30 for the pressures and fill gas temperatures discussed herein. In a second simulation, it is assumed that the gas mixes completely throughout the cells 36 during the fill process. This is a best case scenario of an adiabatic filling, but also would not occur in a real situation. The temperature of the fill gas is also 300 K and the pressure of the gas in all of the cells 36 before the filling process is 2.8 MPa. In this simulation, certain assumptions are also made. First, there is no heat exchange between the contained gas and the container 30. Second, the fill reservoir 32 is infinitely large. Third, the contained gas 26 in the container 30 has the same temperature and pressure throughout.

FIG. 4 is a graph with pressure in MPa on the horizontal axis and temperature in degrees Celsius on the vertical axis showing the results of the second simulation. As shown, if the gas mixes perfectly through the cells 36, the temperature of the contained gas when the maximum fill pressure is reached (35 MPa) is about 150° C.

The simulations discussed above show that the fail temperature of the liner 14 is easily reached if the container 30 is filled with hydrogen gas at ambient temperature through adiabatic compression. As discussed above, these simulations do not allow for heat to be removed from the contained gas through the container walls. The rate of the fill process is thus not relevant for pure adiabatic compression. Some heat sinking will occur through the container wall and through the adapter 18. However, because the liner 14 is plastic, minimal heat will be aborbed therein. Thus, the amount of time required to fill the container 10 that will maintain the temperature of the contained gas below the fail temperature of the liner 14 through thermal conductivity is unacceptably high.

It is known to cool the fill gas to a suitable temperature so that it does not cause the contained gas to increase beyond the fail temperature of the liner 14. However, such cooling systems at the storage facility would add significant cost to the filling operation, and thus is also generably not desirable.

SUMMARY OF THE INVENTION

In accordance with the teachings of the present invention, a pressure container is disclosed that has particular application for storing hydrogen gas under pressure for a fuel cell engine. The container is a type 4 compressed gas container that includes a thermoplastic gas tight liner and an outer structural wall formed thereon. An adapter is sealed to the outer wall and the liner to allow fill gas to fill the container under pressure, and provide regulated fuel gas during operation of the fuel cell engine. A fill vessel is provided within the liner and is sealed to the adapter. The fill gas is at ambient temperature and flows into the container through the adapter. The fill gas is confined within a space between an outside surface of the fill vessel and the liner so that the temperature around the liner is not significantly increased during the fill process. An opening is provided in the fill vessel opposite to the adapter so that the fill gas forces the heated contained gas within the container into the fill vessel through the opening away from the liner.

Additional advantages and features of the present invention will become apparent from the following description and appended claims, taken in conjunction with the accompanying drawings.

DETAILED DESCRIPTION OF THE EMBODIMENTS

The following discussion of the embodiments of the invention directed to a pressure container for storing hydrogen gas for a fuel cell engine is merely exemplary in nature, and is in no way intended to limit the invention or its application or uses. For example, the pressure container of the invention is discussed as being used for storing hydrogen gas on a vehicle for a fuel cell engine. However, the pressure container can store other gases for fuel cell or other applications according to the invention.

Figure 1:
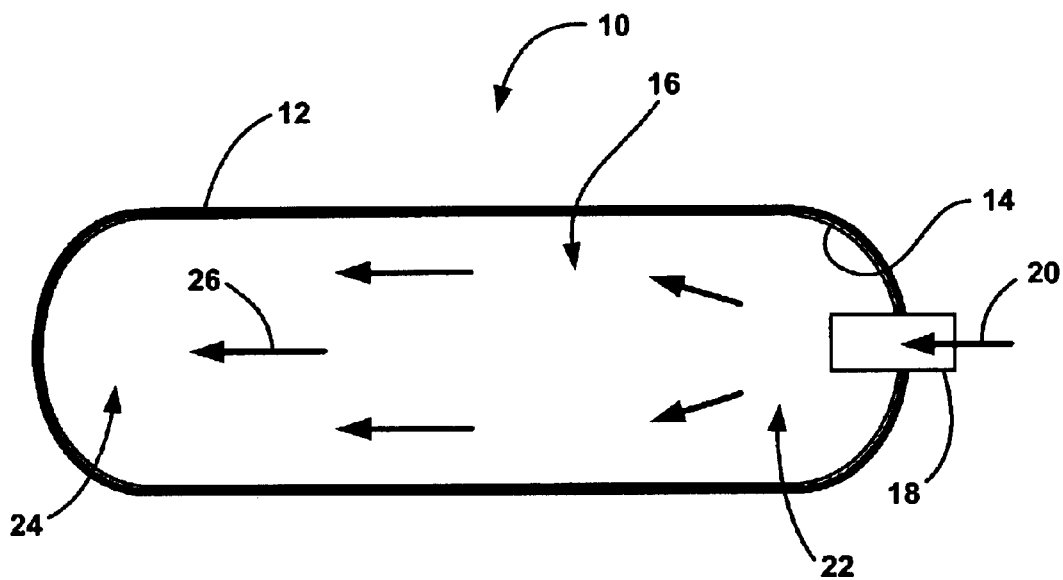
FIG. 1 is a cross-sectional plan view of a known type 4 pressure container for storing hydrogen gas.
Figure 5:
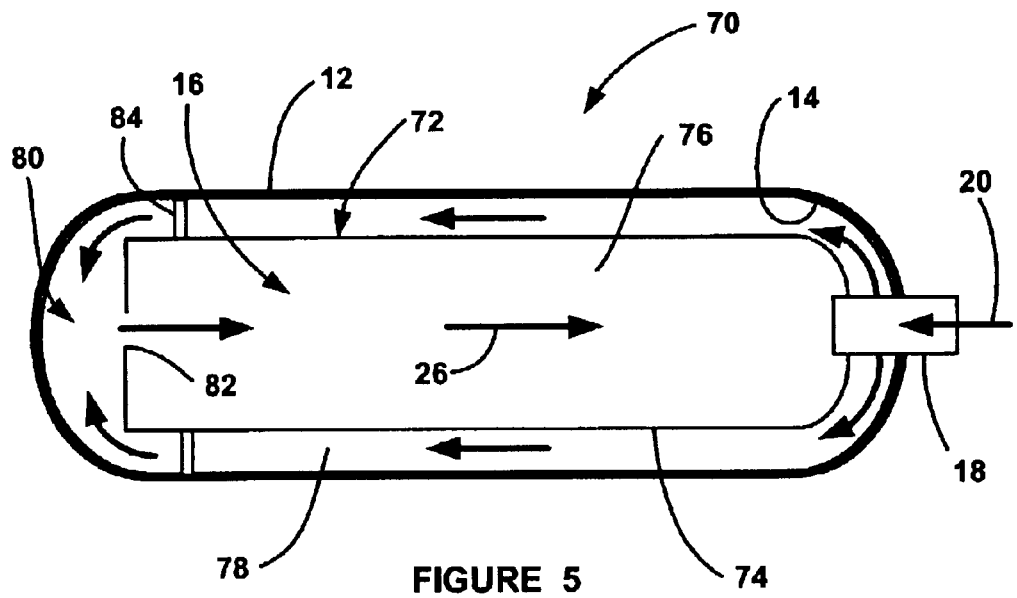
FIG. 5 is a cross-sectional plan view of a type 4 pressure container employing a fill vessel, according to an embodiment of the present invention.
Figure 2:
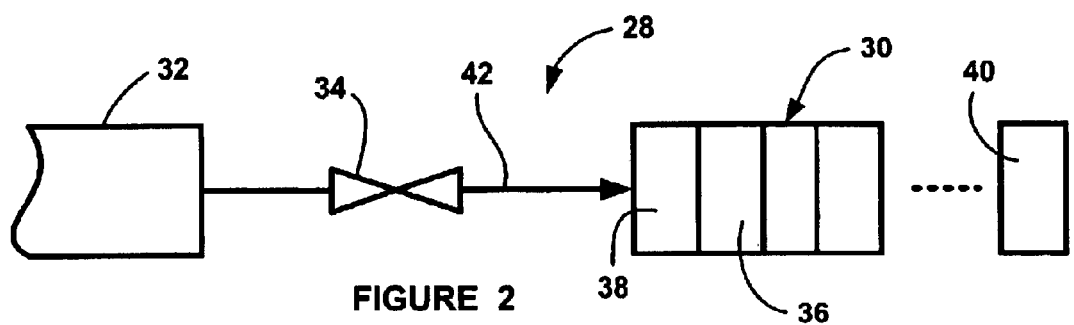
FIG. 2 is a plan view of a simulation model showing a storage reservoir filling a pressure container with fill gas, where the pressure container is separated into pressure cells.
Figure 3:
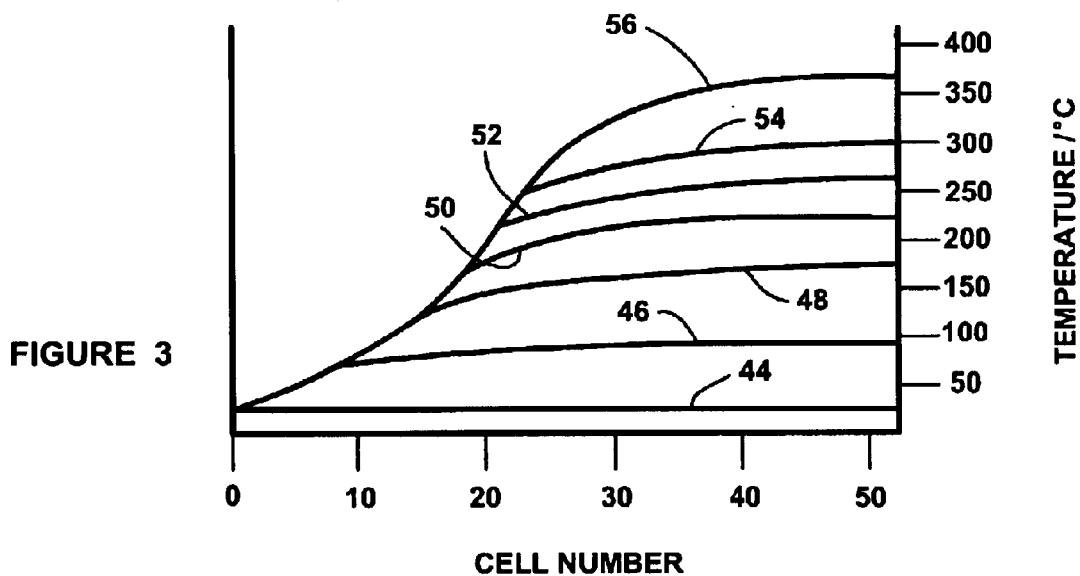
FIG. 3 is a graph with cell number on the horizontal axis and temperature on the vertical axis showing the temperature within the various cells of the pressure container shown in FIG. 2 at different pressures for one simulation.
Figure 4:
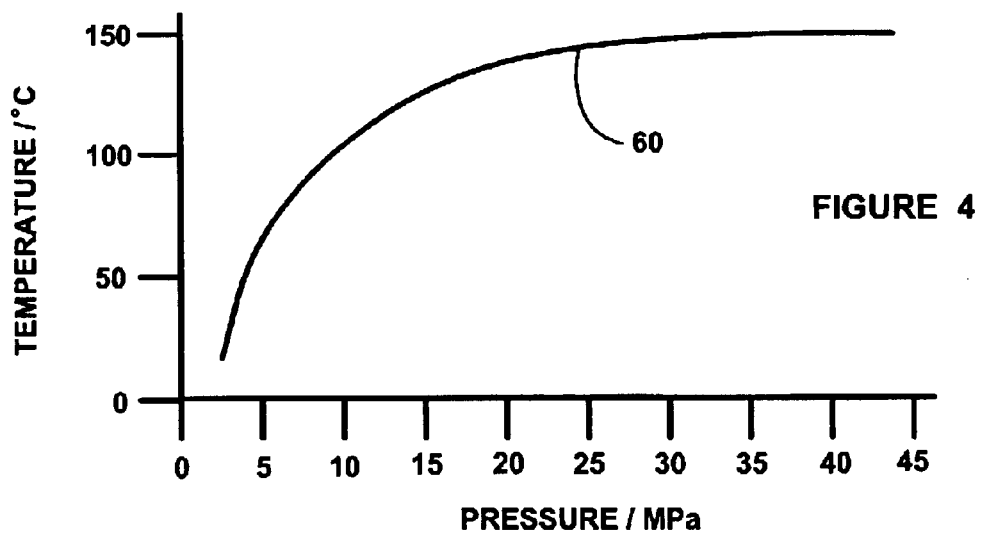
FIG. 4 is a graph with pressure on the horizontal axis and temperature on the vertical axis showing the temperature of the gas within the pressure container over different pressures for another simulation.

FIG. 5 is a cross-sectional plan view of a type 4 pressure container 70, according to an embodiment of the present invention, for storing hydrogen gas for a fuel cell engine. The pressure container 70 is similar to the pressure container 10 discussed above where like reference numerals represent like elements. The container 70 is cylindrically shaped in this embodiment and has a particular diameter and length for this application. However, this is merely exemplary in that the size and shape of the container 70 can vary within the scope of the present invention.

According to the invention, the container 70 includes a fill vessel 72 positioned within the liner 14. The fill vessel 72 has the general shape of the container 70. The vessel 72 includes a wall 74 that defines an inner fill chamber 76 and a gap 78 between the wall 74 and the liner 14, as shown. The vessel 72 is made of a suitable thermally conductive material, such as aluminum or steel, to have a desirable thermal property as discussed herein. The wall 74 is sealed to the adapter 18 by welding or the like so that the fill gas 20 is forced to flow into the container 70 through the gap 78 to an end 80 of the container 70 opposite to the adapter 18, as shown. The fill gas 20 causes the contained gas 26 within the container 70 to be forced towards the end 80, and enter the vessel 72 through an opening 82.

The contained gas 26 within the container 70 is heated as a result of the adiabatic compression caused by the fill gas 20, but it is confined within the vessel 72, and does not contact the liner 14. Therefore, even though the heated contained gas 26 may exceed the fail temperature of the liner 14, it does not damage the liner 14. The fill gas 20 as it is being introduced into the container 70 does contact the liner 14 within the gap 78, but it is still relatively close to ambient temperature so as to not significantly increase the temperature of the liner 14. Heat from the contained gas 26 within the vessel 72 is transferred to the wall 74 and stored in the adapter 18 so that heat is removed from the contained gas 26.

The opening 82 has a small enough diameter so that the contained gas 26 within the vessel 72 does not significantly leak out into the gap 78. Also, the vessel 72 does not support any mechanical load in that the pressure on both sides of the wall 74 is about the same. Therefore, the thickness of the wall 74 can be minimal, and thus will not significantly add to the weight of the container 70. Further, the width of the gap 78 is small enough so that the majority of the volume of the container 70 is within the vessel 72. Also, a support structure 84 is coupled to the wall 74 and the outer layer 12 to stabilize the vessel 72 within the container 70, which is important for vehicle applications. The support structure 84 can be any suitable structure that allows the fill gas 20 to propagate around it.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A pressure container comprising:
    an outer wall system defining a container chamber therein, said wall system including an outer structural wall and an inner gas tight liner;
    an adapter positioned in the wall system for allowing a fill gas to fill the container chamber under pressure; and
    a fill vessel positioned within the container chamber, said fill vessel including a wall defining a fill chamber within the fill vessel and a gap between the fill vessel wall and the wall system, said fill vessel including an opening through the fill vessel wall so that the gap and the fill chamber are in fluid communication, wherein the fill gas is caused to flow through the adapter into the gap between the fill vessel and the wall system so that gas within the container chamber is forced into the fill chamber.

2. The container according to claim 1 wherein the fill vessel is sealed to the adapter.

3. The container according to claim 1 wherein the fill vessel is thermally coupled to the adapter.

4. The container according to claim 3 wherein the fill vessel is made of a material selected from the group consisting of metal and heat resistant, thermally conductive materials.

5. The container according to claim 1 wherein the outer wall is made of a fibrous synthetic material and the liner is made of high-density polyethylene plastic.

6. The container according to claim 1 wherein the container is a type 4 pressure container.

7. The container according to claim 1 further comprising a support device, said support device being mounted to the fill vessel and the wall system opposite to the adapter to stabilize the fill vessel within the container chamber.

8. The container according to claim 1 wherein the opening in the fill vessel is at an end of the fill vessel opposite to the adapter.

9. The container according to claim 1 wherein the fill gas is hydrogen gas for a fuel cell.

10. A pressure container for storing compressed hydrogen gas, said container comprising:
    an outer structural wall;
    a gas tight inner liner positioned adjacent to the outer structural wall, said inner liner defining a container chamber therein;
    an adapter extending through the outer wall and the liner and being sealed thereto, said adapter allowing a hydrogen fill gas to fill the container chamber under pressure; and
    a fill vessel positioned within the container chamber and being sealed and thermally coupled to the adapter, said fill vessel including a wall defining a fill chamber within the fill vessel and a gap between the fill vessel wall and the liner, said fill vessel including an opening through the fill vessel wall opposite to the adapter so that the gap and the fill chamber are in fluid communication, wherein the hydrogen fill gas is caused to flow through the adapter into the gap between a fill vessel and a liner so that gas within the container chamber is forced into the fill chamber.

11. The container according to claim 10, wherein the outer wall is made of a fibrous synthetic material and the liner is made of a high-density polyethylene plastic.

12. The container according to claim 10 wherein the container is a type 4 pressure container.

13. The container according to claim 10 wherein the fill vessel is made of a material selected from the group consisting of metal and heat resistant, thermally conductive materials.

14. The container according to claim 10 further comprising a support device, said support device being mounted to the fill vessel and the liner opposite to the adapter to stabilize the fill vessel within the container chamber.

15. A method of filling a pressure container with compressed gas, comprising:

providing an outer structural wall;

providing a gas tight liner defining a container chamber therein;

providing an adapter extending through the outer wall and the liner;

providing a fill vessel within the container chamber that is sealed and thermally coupled to the adapter, where the fill vessel includes a wall defining a fill chamber within the fill vessel and a gap between the fill vessel wall and the liner; and forcing a fill gas through the adapter and into the gap so that fill gas forces contained gas within the container chamber through an opening in the fill vessel and into the fill chamber.

16. The method according to claim 15 further comprising rigidly securing an end of the fill vessel to the liner opposite to the adapter.

17. The method according to claim 15 wherein the fill gas is hydrogen gas.

18. The method according to claim 15 wherein providing an outer structural wall and a gas tight liner includes providing an outer structural wall made of a fibrous synthetic material and a gas tight liner made of a high-density polyethylene plastic.

19. The method according to claim 15 wherein providing a fill vessel includes providing a fill vessel made of metal.

20. A pressure container comprising:

an outer wall system defining a container chamber therein;

an adapter positioned in the wall system for allowing a fill gas to fill the container chamber under pressure;

a fill vessel positioned within the container chamber, said fill vessel including a wall defining a fill chamber within the fill vessel and a gap between the fill vessel wall and the wall system, said fill vessel including an opening through the fill vessel wall so that the gap and the fill chamber are in fluid communication, wherein the fill gas is caused to flow through the adapter into the gap between the fill vessel and the wall system so that gas within the container chamber is forced into the fill chamber; and a support device, said support device being mounted to the fill vessel and the wall system opposite to the adapter to stabilize the fill vessel within the container chamber.

21. A pressure container comprising:

an outer wall system defining a container chamber therein;

an adapter positioned in the wall system for allowing a fill gas to fill the container chamber under pressure; and a fill vessel positioned within the container chamber, said fill vessel including a wall defining a fill chamber within the fill vessel and a gap between the fill vessel wall and the wall system, said fill vessel including an opening through the fill vessel wall so that the gap and the fill chamber are in fluid communication, wherein the fill gas is caused to flow through the adapter into the gap between the fill vessel and the wall system so that gas within the container chamber is forced into the fill chamber, and wherein the fill gas is hydrogen gas for a fuel cell.

22. A pressure container comprising:

an outer wall system defining a container chamber therein;

an adapter positioned in the wall system for allowing a fill gas to fill the container chamber under pressure; and a fill vessel positioned within the container chamber, said fill vessel including a wall defining a fill chamber within the fill vessel and a gap between the fill vessel wall and the wall system, said fill vessel including an opening through the fill vessel wall so that the gap and the fill chamber are in fluid communication, wherein the fill gas is caused to flow through the adapter into the gap between the fill vessel and the wall system so that gas within the container chamber is forced into the fill chamber, and wherein the fill vessel is directly sealed and thermally coupled to the adaptor.

* * * * *